Patented Sept. 23, 1930

1,776,670

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY

PROCESS FOR MAKING INACTIVE MENTHOL

No Drawing. Original application filed June 30, 1927, Serial No. 202,739, and in Germany February 15, 1927. Divided and this application filed September 20, 1928. Serial No. 307,334.

This is a process for the production of inactive menthol, new isomer of inactive menthol and making the same, being a divisional application of application Serial No. 202,739 filed June 30th, 1927.

According to this process inactive neo-isomenthol is transformed to inactive menthol. This transformation of the inactive neo-isomenthol may be effected by the action of mentholates of the alkali forming metals at temperatures above 100 degrees centigrade, the inactive neo-isomenthol being employed by itself or in admixture with other isomers of inactive menthol and separating the crude inactive menthol from the resulting mixture by physical methods, for instance, by freezing-out or fractional distillation, purifying the crude inactive menthol by conversion into its esters as described in U. S. Patent 1,672,346 and transforming the residual isomers anew.

*Example 1.*—Three parts of metallic sodium are dissolved in 100 parts of inactive neo-isomenthol, and the mixture of neo-isomenthol and sodium neo-isomentholate is heated at 180 degrees centigrade for about 24 hours. The reaction product is then driven off by means of steam. The inactive menthol is separated from the resulting mixture of isomers by freezing out or fractional distillation, and is further purified by way of the esters. The isomeric menthols left from the separation and purification are subjected to further transformation.

*Example 2.*—A mixture of 50 parts of inactive neo-isomenthol and 50 parts of a mixture of liquid isomeric menthols left over from Example 1, is treated with the corresponding sodium mentholates as in Example 1, and the resulting menthols mixture is subjected to further treatment as described therein.

We claim:

1. The process for manufacturing inactive menthol, the racemate of natural menthol, which consists in heating inactive neo-isomenthol with mentholates of the alkali forming metals and separating from the reaction product crude inactive menthol by physical methods.

2. The process for manufacturing inactive menthol, the racemate of natural menthol, which consists in heating inactive neo-isomenthol admixed with other isomers of inactive menthol, with mentholates of the alkali forming metals and separating from the reaction product crude inactive menthol by physical methods.

3. The process for manufacturing inactive menthol, the racemate of natural menthol, which consists in heating inactive neo-isomenthol with mentholates of the alkali forming metals and separating from the reaction product crude inactive menthol by fractional distillation.

4. The process for manufacturing inactive menthol, the racemate of natural menthol, which consists in heating inactive neo-isomenthol mixed with other isomers of inactive menthol with mentholates of the alkali forming metals, and separating from the reaction product crude inactive menthol by fractional distillation.

5. The process for manufacturing inactive menthol, the racemate of natural menthol, which consists in heating inactive neo-isomenthol with mentholates of the alkali forming metals and separating from the reaction product crude inactive menthol by fractional crystallization.

6. The process for manufacturing inactive menthol, the racemate of natural menthol, which consists in heating inactive neo-isomenthol mixed with other isomers of inactive menthol with mentholates of the alkali forming metals, and separating from the reaction product crude inactive menthol by fractional crystallization.

In testimony whereof we affix our signatures.

KARL SCHÖLLKOPF.
ARTHUR SERINI.